Dec. 22, 1970  J. M. VALDESPINO  3,548,593
FLUID MOTOR POWER PLANT
Filed April 14, 1969  3 Sheets-Sheet 1

INVENTOR
JOE M. VALDESPINO
BY
ATTORNEYS

Dec. 22, 1970  J. M. VALDESPINO  3,548,593
FLUID MOTOR POWER PLANT
Filed April 14, 1969  3 Sheets-Sheet 2
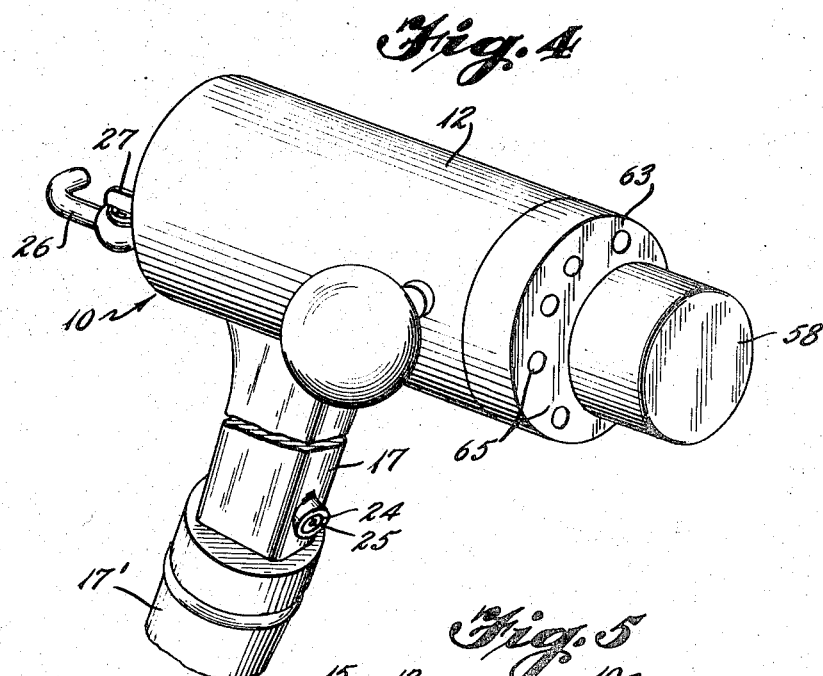
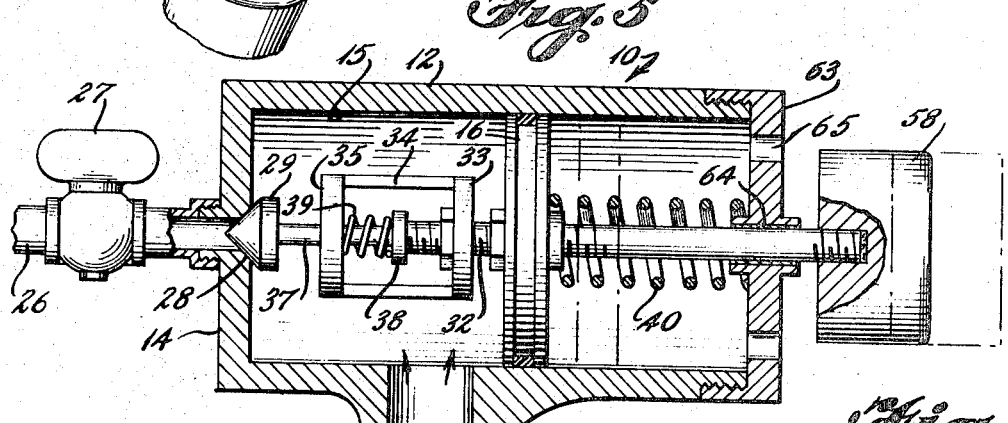
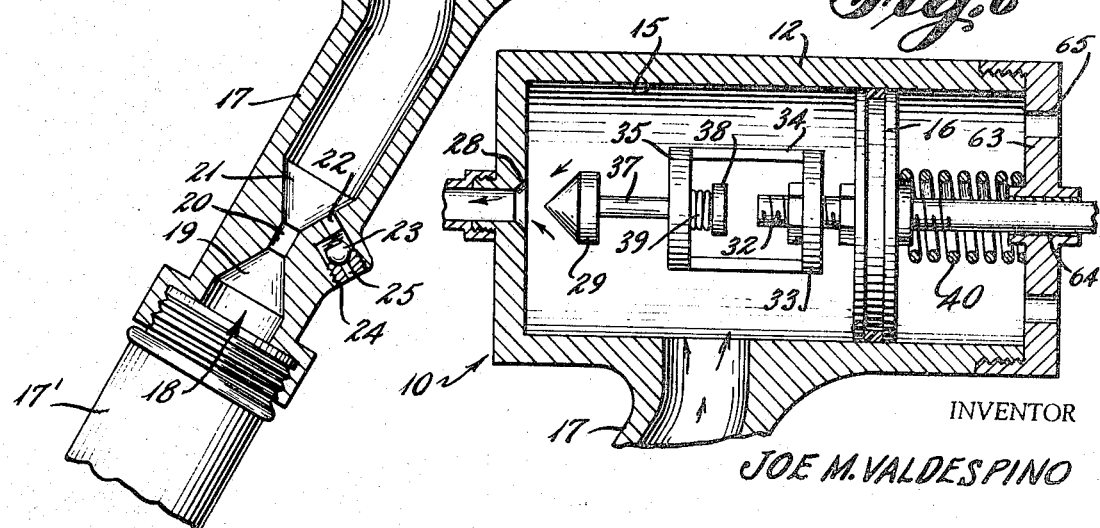
INVENTOR
JOE M. VALDESPINO
BY
ATTORNEYS Dec. 22, 1970  J. M. VALDESPINO  3,548,593
FLUID MOTOR POWER PLANT Filed April 14, 1969  3 Sheets-Sheet 3

INVENTOR
JOE M. VALDESPINO

BY
ATTORNEYS

United States Patent Office 3,548,593
Patented Dec. 22, 1970

3,548,593
FLUID MOTOR POWER PLANT
Joe M. Valdespino, 5023 Golf Club Parkway,
Orlando, Fla. 32808
Filed Apr. 14, 1969, Ser. No. 815,594
Int. Cl. F01l 21/02; F15b 11/08, 13/04
U.S. Cl. 60—54.5
8 Claims

ABSTRACT OF THE DISCLOSURE

Apparatus including a fluid motor having a piston which automatically is extended and retracted rapidly by water and air under pressure from a city or other water system and adapted to exert a pulsating force which will perform work.

BACKGROUND OF THE INVENTION

(1) Field of the invention

The present invention relates generally to power plants of different kinds and relates particularly to a power plant driven by a fluid motor supplied with water or other fluid under pressure from any desired source.

(2) Description of the prior art

Heretofore many efforts have been made to provide power plants which have included fluid motor reciprocators operable either by gas or liquid under pressure. However, these prior art devices have been too heavy, bulky and unwieldy to serve the purpose for which they were intended, have required an excessive amount of water or other fluid, have been slow to respond to the pressure buildup, have been expensive to manufacture and maintain, and for other reasons have not been satisfactory.

SUMMARY OF THE INVENTION

The present invention includes a relatively small lightweight power plant or fluid motor reciprocator which generates impulses at a rapid rate of speed and transmits such impulses to an impact tool, pump or other device to perform work. The power plant is adapted to be driven by fluid under pressure from any desired source, such as a city water system or the like, and is adapted to mix air with the water to substantially reduce the amount of water required for the operation.

It is an object of the invention to provide a power plant adapted to be driven by a suitable source of water and air under pressure and in which the rate of pulsations can be easily controlled from the exterior of the device.

Another object of the invention is to provide a power plant having a movable piston operated by water and air under pressure and having means for opening and closing a pressure outlet valve automatically in such a manner that water under pressure will be introduced continuously into the power plant while air is introduced intermittently.

BRIEF DESCRIPTION OF THE DRAWINGS

FIG. 4 is a perspective of a modified form of the invention.

FIG. 5 is an enlarged vertical section illustrating the device in retracted position.

FIG. 6 is a section similar to FIG. 5 illustrating the device in extended position.

DESCRIPTION OF THE PREFERRED EMBODIMENTS

Figure 1:
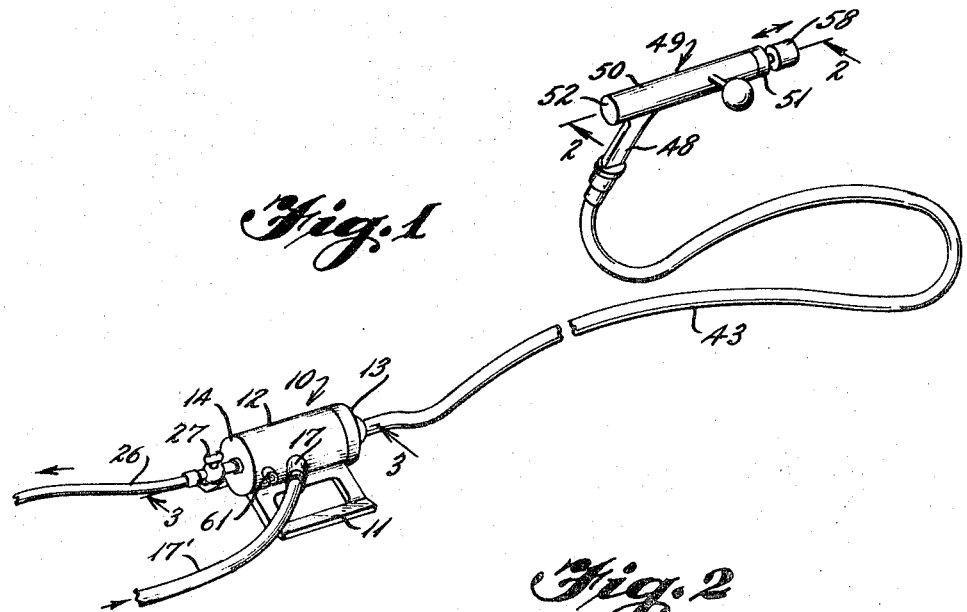
FIG. 1 is a perspective illustrating one application of the invention.
Figure 2:
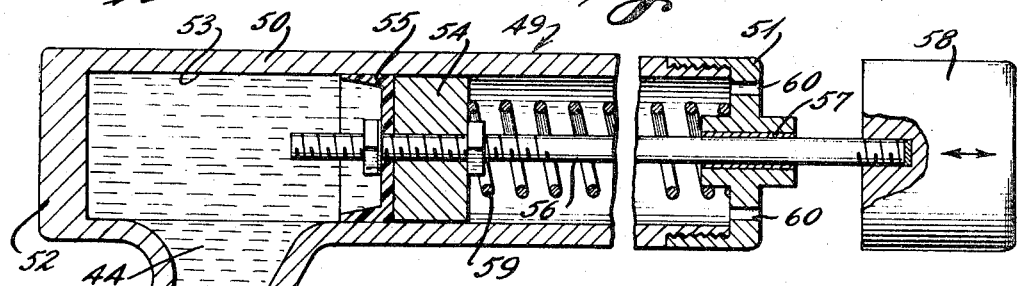
FIG. 2 is an enlarged vertical section of a reciprocating tool on the line 2—2 of FIG. 1.
Figure 3:
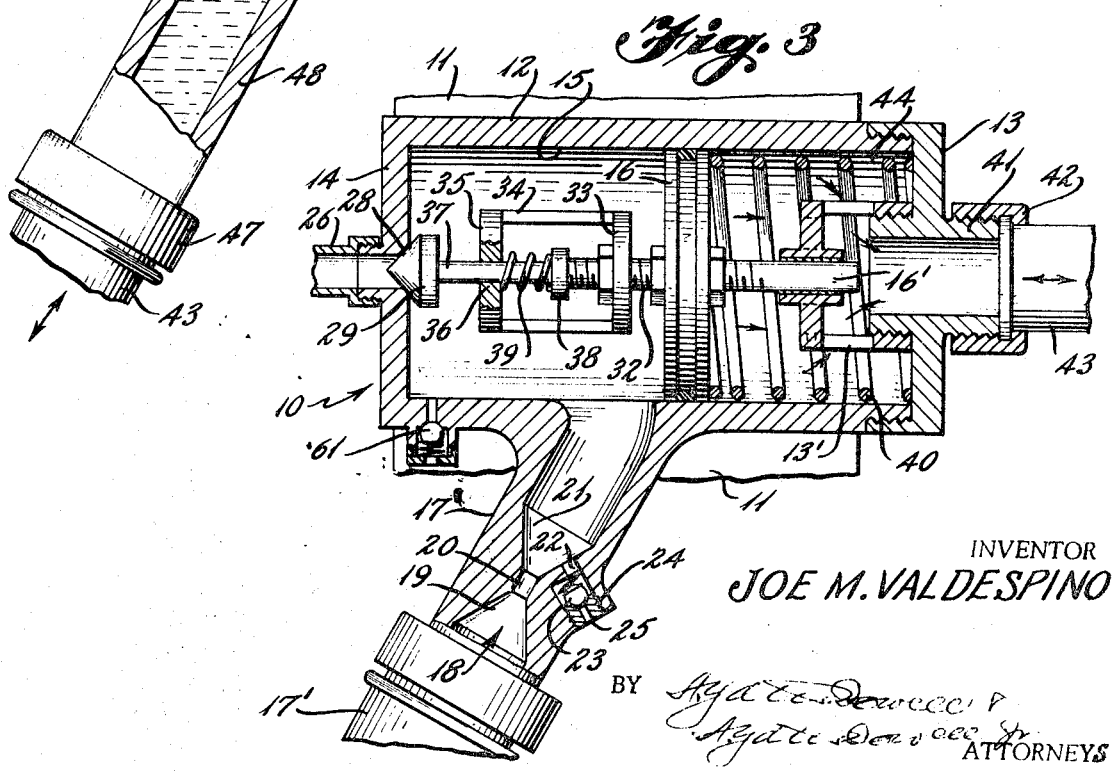
FIG. 3 is an enlarged section of the power plant taken on the line 3—3 of FIG. 1.

With reference of FIGS. 1–3 of the drawings, a fluid motor reciprocator or power plant 10 is provided and such power plant is mounted on a base 11 preferably located adjacent to a source of water under pressure (not shown). The power plant includes a generally cylindrical body 12 having a front end 13 and a rear end 14. The cylindrical body includes an internal bore 15 within which a piston 16 is reciprocally mounted to divide the bore 15 into front and rear variable compartments. If desired a piston rod 16' can be connected at one end to the piston 16 and the opposite end can be slidably received within a spider 13' mounted on the front end 13 and adapted to guide the piston. Adjacent to the rear end of the cylindrical body 12, a water inlet 17 is provided which is connected by a hose or pipe 17' to a source of water under pressure (not shown) and adapted to introduce such water into the rear compartment. The water under pressure can be supplied by a pump from a well, lake or other body of water, or could be supplied from a city water supply which normally is under a pressure of 40–60 p.s.i.

Within the inlet 17 a venturi 18 is provided having a converging high pressure portion 19 connected to a constricted throat portion 20 through which water under pressure is adapted to be discharged into a diverging portion 21 and into the rear compartment of the cylindrical body 12. The diverging portion 21 is in communication with the atmosphere through a relatively small bore or opening 22 having a spring-loaded check valve 23 retained therein by a threaded plug 24. Such plug has an opening or orifice 25 which is open to the atmosphere at one end and normally is closed by the check valve 23 at the opposite end for a purpose which will be described later.

At the rear end 14 of the body 12 a discharge hose or pipe 26 is connected to the body 12 substantially along the longitudinal axis of such body. The discharge hose 26 is substantially larger in diameter than the restricted throat 20 and a petcock or adjustable valve 27 is provided to control the amount of water discharged from the bore 15. The inner surface of the rear end 14 has a valve seat 28 which cooperatively receives a valve 29.

In order to cause reciprocation of the piston 16, such piston is provided with a threaded stub shaft 32 extending rearwardly therefrom and adapted to threadedly engage the forward end 33 of a cage 34. The opposite or rear end 35 of the cage has an opening 36 which slidably receives a valve stem 37 on one end of which the valve 29 is mounted and on the opposite end an enlarged head 38 is disposed. A relatively weak coil spring 39 is located between the enlarged head 38 and the rear end 35 of the cage 34 and such spring is adapted to urge the enlarged head 38 toward the end of the shaft 32 which functions as a stop. Preferably an enlarged coil spring 40 is disposed between the piston 16 and the front end 13 to return the piston 16 when the pressure within the rear compartment is relieved by the opening of the valve 29. The stroke or length of travel of the piston 16 can be controlled by adjusting the position of the cage 34 relative to the end of the shaft 32.

The front end 13 of the body 12 is provided with a nipple 41 which threadedly engages a connector 42 carried by a hose 43. The opposite end of the hose 43 is threadedly connected to a connector 47 at one end of a hollow handle 48 of an impact tool 49. The tool 49 includes an elongated generally cylindrical body 50 having a front end 51 and a rear end 52 and such body 50 includes an internal bore 53 in which a piston 54 is reciprocally mounted. The piston 54 is adapted to divide the bore 53 into front and rear variable compartments. A seal 55 is connected to the piston 54 by nuts or other fasteners mounted on a piston rod 56 having one end extending outwardly through a bushing or bearing 57 carried by the front end 51. A work-performing head 58 is interchangeably mounted on the free end of the piston rod 56 in any desired manner, as by screw threads or the like. If desired a coil spring 59 can be disposed within the front compartment of the bore 53 to assist in returning the piston 54 to its retracted position. The front compartment of the body 12, the hose 43 and the rear compartment of the body 50 are substantially filled with a fluid 44 such as hydraulic oil, water, air, or the like.

In the operation of this modification, as illustrated in FIG. 3, the piston 16 is in retracted position with the valve 29 cooperatively engaging the valve seat 28. When water or other fluid under pressure is introduced into the bore 15 through the venturi 18, a pressure buildup will take place and will move the piston 16 from left to right against the tension of the coil spring 40. During the movement of the piston to the right, the pressure of the water within the rear compartment of the bore 16 will maintain the valve 29 sealed against the valve seat 28, while the cage 34 is being moved by the piston against the tension of the relatively weak coil spring 39. When the coil spring 39 has been substantially totally collapsed, any further movement to the right of the piston 16 will cause the valve 29 to be unseated from the valve seat 28 and permit the water under pressure to escape through the opening 25 and the discharge hose 26 and thereby reduce the pressure within the rear compartment of the body 12. As soon as the valve 29 is unseated, the coil spring 39 will expand and move the enlarged head 38 to the right until the enlarged head 38 engages the end of the shaft 32.

The discharge of water through the hose 26 relieves the pressure within the bore 15 and permits the coil spring 40 to return the piston 16 to the left, as illustrated in FIG. 3, until the valve 29 again engages the valve seat 28 so that pressure again will build up within the bore. During the return stroke of the piston 16 the water under pressure being introduced through the constricted throat 20 will be accelerated and the pressure will be decreased in direct proportion due to the venturi effect and will create a negative pressure within the diverging portion 21 so that atmospheric air will unseat the check valve 23 and permit air to be entrained within the water being introduced through the throat 20 into the rear compartment of the body 12. The air thus entrained will rise to the top of the bore 15 and will provide a compressible medium within the rear compartment and substantially reduce the amount of water required to again force the piston toward the front of the body 12. When the piston is being moved to the right during the power stroke, the internal pressure will be greater than the external pressure so that the check valve 23 will be closed.

The speed of reciprocation of the piston 16 is controlled by regulating the valve 27. When the valve is fully open there is substantially no resistance to the passage of water through the hose 26 due to the fact that the hose is much larger than the venturi throat 20 and, therefore, the piston will be returned at a rapid rate by the coil spring 40. When the valve 27 is partially closed, the water within the rear compartment of the body 12 cannot be evacuated as rapidly and the piston 16 will be returned more slowly. By operation of the valve 27 the speed of the piston can be controlled at any desired rate between 0–1000 cycles per minute.

When the piston 16 is moved to the right in the power stroke, the compressible or non-compressible fluid 44 will be forced through the hose 43 into the bore 53 of the impact tool 49 and force the piston 54 and the head 58 to the right, as illustrated in FIG. 2. When the pressure within the power plant 10 is relieved by the opening of the valve 29 and the piston 16 is returned by the coil spring 40, a negative pressure or partial vacuum will be created in the forward compartment of the bore 15 so that the fluid 44 will be drawn from the impact tool 49 back to the power plant 10 and the piston 54 will be retracted to its initial position. The retraction of the piston 54 is assisted by the coil spring 59.

It is noted that the front end 51 of the cylinder 50 is provided with a plurality of openings 60 providing communication between the front compartment of bore 53 and the atmosphere to minimize resistance to the movement of the piston 54. Also a high pressure safety relief valve 61 may be located adjacent to the rear end 14 of the power plant 10 so that if the work head 58 is jammed, or if for some other reason the piston 54 cannot complete its stroke, the relief valve 61 will open and prevent damage to the power plant.

If desired the total cross-sectional area of the bore 15 of the power plant can be substantially larger than the cross-sectional area of the bore 53 of the impact tool so that a relatively short stroke of the power plant will produce a substantially longer stroke within the impact tool.

With reference to FIGS. 4–6, a modified form of the invention is disclosed in which the power plant and the impact tool are combined into a single unit. In this modification the structure and operation of the cylindrical body 12 is substantially the same as that previously described with the exception that the front end 13 has been replaced by a front end 63 having a central bushing or bearing 64 and a plurality of openings 65 providing communication between the front compartment of the bore 15 and the atmosphere on one side of the piston 16. A piston rod 66 is connected to the piston 16 and such piston rod extends outwardly through the bushing 64 and is adapted to receive the head 58.

The operation of this modification is substantially the same as the first modification except that the work head 58 is moved directly by the piston 16.

Figure 7:
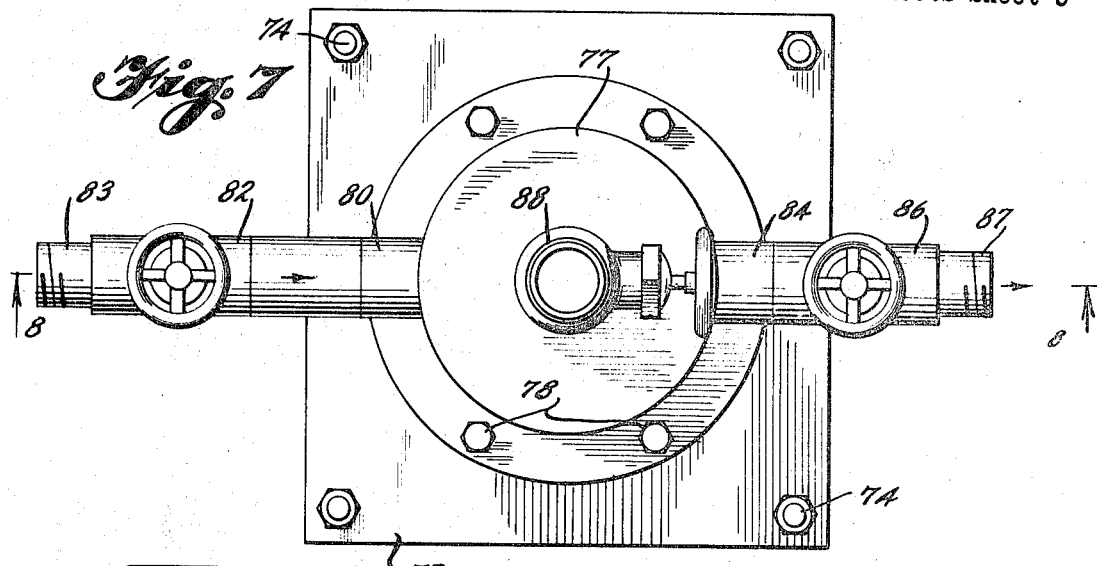
FIG. 7 is a top plan view of another modified form of the invention.
Figure 8:
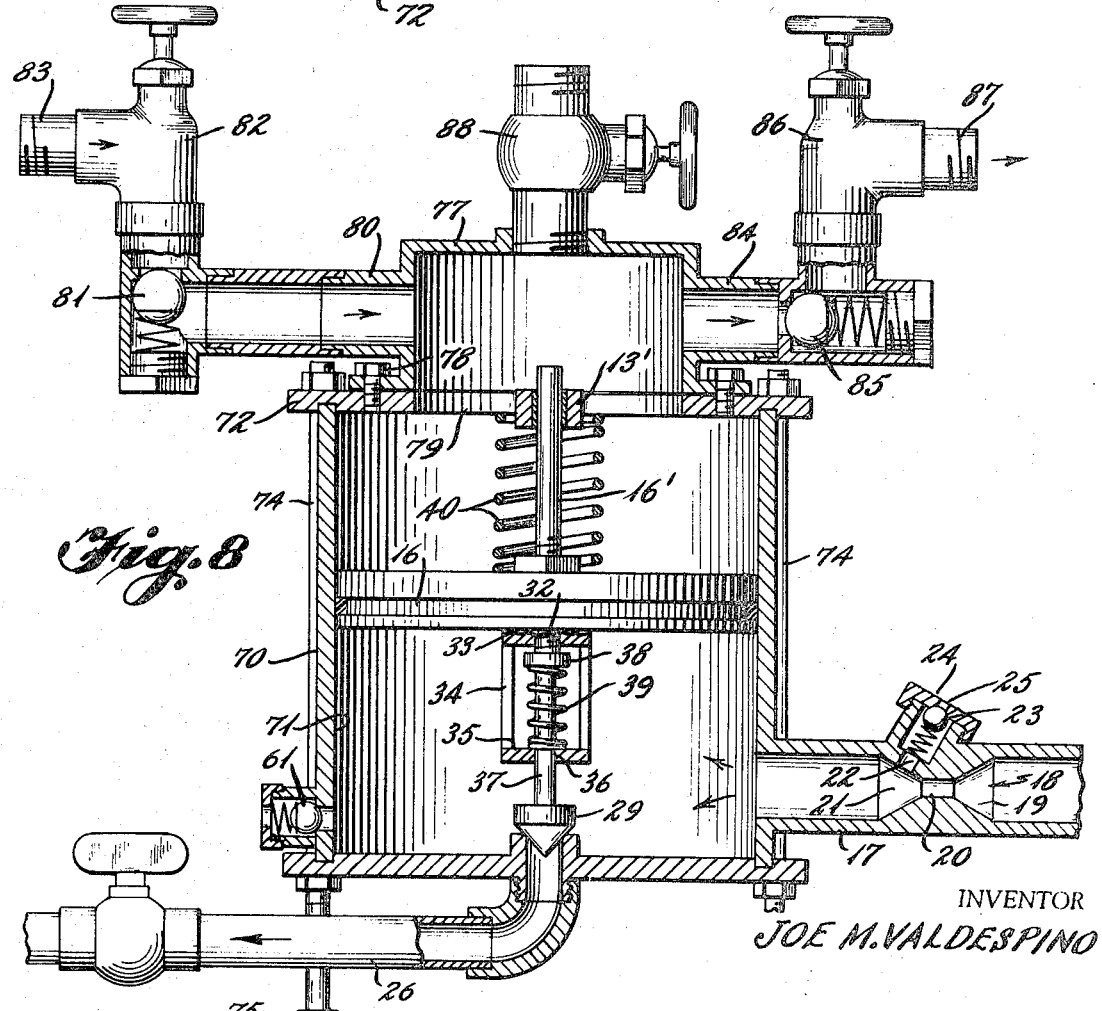
FIG. 8 is a vertical section on the line 8—8 of FIG. 7.

With reference to FIGS. 7 and 8 a further modified form of the invention is disclosed in which the power plant is used as a reciprocating pump. In this modification the power plant or reciprocator is substantially the same as that previously described with the exception that a generally vertically disposed cylindrical body 70 having an internal bore 71 is provided with upper and lower end plates 72 and 73, respectively, connected together and held in assembled relation by a plurality of bolts 74. Such bolts extend downwardly past the lower plate 73 and serve as legs to support the body 70. If desired each of the legs is adjustably connected to a foot 75 utilized for levelling the device. The body 70 includes a piston 16, water inlet 17 having a venturi 18 therein, a discharge hose 26, valve 29 and cage 34, as previously described.

A bell or chamber 77 is mounted on the upper end plate 72 in any desired manner, as by fasteners 78, and such bell is in communication with the upper compartment of the bore 71 through one or more openings 79 in the upper end plate 72. The bell 77 includes an inlet 80 having a one-way check valve 81 therein and a cutoff valve 82. Such valve includes a nipple 83 adapted to be connected to a conventional hose or pipe (not shown) which can be connected to a source of fluid in either liquid or gaseous form.

Spaced from the inlet 80 an outlet 84 is provided having a one-way check valve 85 and a cutoff valve 86 which is adapted to be connected by a nipple 87 to a hose or pipe (not shown) for transmitting fluid under pressure from the bell 77.

As illustrated an outlet valve 88 is provided for communicating with the interior of the bell 77 and such valve may be connected to the hose 43 and the opposite end of such hose can be connected to any desired tool, such as the impact tool previously described with reference to FIGS. 1–3.

In the operation of this modification, when the device is to be used as a pump, the outlet valve 88 is closed and the cutoff valves 82 and 86 are open. On the power stroke of the piston 16 fluid in the upper compartment of the cylindrical body 70 opens the check valve 85 and forces the fluid through the cutoff valve 86 while the check valve 82 remains closed. On the return stroke the check valve 85 will close and the check valve 82 will open so that fluid will flow through the cutoff valve 82 and the inlet 80 and fill the bell 77 and the upper compartment of the body 70. By using the structure thus described fluid will flow into the bell through the inlet 80 and will be discharged from the bell through the outlet 84 under pressure when the piston 16 is operated.

When it is desired to drive a tool as disclosed in FIGS. 1–3, the cutoff valves 82 and 86 are closed and the outlet valve 88 is open after it is connected to the hose 43 so that on the power stroke of the cylinder fluid will be forced through the hose to operate the work-performing head and on the return stroke of the cylinder such head will be retracted.

I claim:

1. A fluid driven power plant comprising a body having an elongated bore, piston means slidably mounted in said bore and dividing said bore into a pair of compartments, cage means fixed to one side of said piston means and extending into one of said compartments, valve means slidably connected to said cage means, means for limiting the movement of said valve means relative to said cage means, inlet means for introducing water under pressure into said one compartment for moving said piston means and said cage means in one direction, the movement of said cage means causing said valve means to open and relieve the pressure within said one compartment after the piston means has moved a predetermined distance, spring means within the other of said compartments for returning said piston means when the pressure is relieved to close said valve means, a venturi located in said inlet means, said venturi having a restricted throat portion and a diverging portion, an opening providing communication between said diverging portion and the atmosphere and adapted to entrain air under atmospheric pressure into the water passing through said diverging portion when the piston means is returned, whereby a mixture of air and water will be introduced into said one compartment until the valve means is closed and thereafter water under pressure will be introduced into said one compartment to move the piston means in the other direction until the valve means is opened.

2. The structure of claim 1 including hose means connected to said body and in communication with the other of said compartments, an impact tool connected to said hose means, said impact tool including a body having an elongated bore, a second piston means slidably mounted within the elongated bore of said impact tool and dividing said bore into a pair of compartments, said second piston means having a piston rod extending outwardly of said impact tool, a work head mounted on the opposite end of said piston rod, and fluid means substantially filling the second compartment of said power plant, the first compartment of said impact tool and the hose connecting the same, whereby movement of the piston means of said power plant in one direction will cause fluid to flow through said connecting hose to said impact tool and move said second piston means in the same direction as the power plant piston means.

3. The structure of claim 1 including a piston rod connected at one end to said piston means and extending outwardly of said power plant, and a work head connected to the opposite end of said piston rod.

4. The structure of claim 1 including a bell means mounted on said power plant in communication with the other of said compartments, said bell means having an inlet and an outlet with check valve means in each, and fluid disposed within said other compartment, whereby movement of said piston means in one direction will force fluid from said other compartment outwardly through the outlet of said bell means, and movement of said piston means in the opposite direction will draw fluid into said other compartment through said inlet of the bell means.

5. The combination of an impact tool and a power plant therefor, said power plant comprising a body having an elongated bore, piston means slidably mounted in said bore and dividing said bore into a pair of compartments, a cage fixed to one side of said piston means and extending into one of said compartments, valve means slidably connected to said cage, means for limiting the movement of said valve means relative to said cage, inlet means for introducing water under pressure into said body for moving said piston means and said cage in one direction, the movement of said cage causing said valve means to open and relieve the pressure within said body after the piston means has moved a predetermined distance, spring means within said bore for returning said piston means and closing said valve means when the pressure is relieved, a venturi located in said inlet means, said venturi having a restricted throat portion and a diverging portion, an opening providing communication between said diverging portion and the atmosphere and adapted to entrain air under atmospheric pressure into the water passing through said diverging portion when said piston means is returned, a work head, means for causing said work head to be extended and retracted by movement of said piston means, whereby said piston means is moved in one direction by fluid pressure within said body to extend said work head, and said piston means is moved in the opposite direction by said spring means to retract said work head.

6. The structure of claim 5, in which said means for causing said work head to be extended and retracted includes a piston rod connected at one end to said piston means and at the opposite end to said work head.

7. The structure of claim 5, in which said means for causing said work head to be extended and retracted includes a fluid carried by said body, hose means connected to said body in a position to receive fluid therefrom, a second body having an elongated bore connected to the opposite end of said hose means, said second body having a second piston means slidably mounted in the elongated bore thereof, said second piston means having a piston rod extending outwardly of said second body, and means connecting said work head to said piston rod exteriorly of said second body, whereby movement of said first piston means in one direction will cause fluid to flow through said hose means to said second body and move said second piston means in the same direction as said first piston means and extend said work head.

8. The combination of an impact tool and a power plant therefor, said power plant comprising a body having an elongated bore, piston means slidably mounted in said bore and having cage means fixed to one side thereof, valve means slidably connected to said cage, pressure means for moving said piston means in one direction, the movement of said piston means causing said valve means to open to relieve the pressure after the piston means has moved a predetermined distance, spring means within said bore for returning said piston means to close said valve means, hose means connected to one end of said body, a second body having an elongated bore connected to the opposite end of said hose means, a second piston means slidably mounted in the bore of said second body, fluid carried by said first and second bodies and said hose means, a piston rod connected to said second piston means and extending outwardly of said second body, and a head mounted on the opposite end of said piston rod, whereby movement of said first piston means in one direction will cause said fluid to flow from the first body to the second body and move said second piston means to extend said work head, and movement of said first piston means in the other direction will retract fluid into said first body and retract said work head.

References Cited

UNITED STATES PATENTS

| | | | |
|---|---|---|---|
| 1,780,817 | 11/1930 | Dubois | 91—50X |
| 2,982,255 | 5/1961 | Klenck | 91—232X |
| 3,140,586 | 7/1964 | Joelson | 60—62.5X |

MARTIN P. SCHWADRON, Primary Examiner

R. R. BUNEVICH, Assistant Examiner

U.S. Cl. X.R.

91—232, 441